United States Patent [19]
Montgomery et al.

[11] Patent Number: 5,801,874
[45] Date of Patent: Sep. 1, 1998

[54] OPTICAL SCANNING SYSTEM HAVING MULTI-PASS ACOUSTIC TRAVELING WAVE LENS

[75] Inventors: Robert M. Montgomery, Indialantic; Greg K. Daugherty, Melbourne; Reeder N. Ward; Pat O. Bentley, both of Palm Bay, all of Fla.

[73] Assignee: Harris Corporation, Melbourne, Fla.

[21] Appl. No.: 668,665

[22] Filed: Jun. 25, 1996

[51] Int. Cl.⁶ .................................................. G02F 1/33
[52] U.S. Cl. ........................... 359/305; 359/307; 359/310
[58] Field of Search ..................................... 359/305, 307, 359/310, 314

[56] References Cited

U.S. PATENT DOCUMENTS

| | | | |
|---|---|---|---|
| 4,182,543 | 1/1980 | Wied et al. | 350/96.13 |
| 4,257,016 | 3/1981 | Kramer, Jr. et al. | 359/305 |

FOREIGN PATENT DOCUMENTS 0157383  10/1985  European Pat. Off. ............. 359/305

OTHER PUBLICATIONS

"Quartz Acoustooptical Filter", Vizen et al., Instrum & Exp Tech. (USA), vol. 22, No. 6, p. 2, Nov.–Dec. 1979.
"Guided Acoustic Traveling Wave Lens for High-Speed Optical Scanners" by S.K. Yao, D. Weid and R.M. Montgomery, reprinted from *Applied Optics*, vol. 18, p. 446, Feb. 15, 1979, pp. 446–453.
"Optical Beam Deflection Using Acoustic–Traveling–Wave Technology" by R.H. Johnson and R.M. Montgomery, an article presented at the SPIE Symposium on Optical, Electro–Optical, Laser and Photographic Technology, Aug., 1976.

*Primary Examiner*—Vincent P. McGraw
*Attorney, Agent, or Firm*—Charles E. WAnds

[57] ABSTRACT

A folded acoustic traveling wave lens arrangement imparts multiple passes of an incident optical beam through the traveling wave lens, and thereby effectively maximize utilization of acoustic power. A lens of optically transmissive bulk material, such as quartz, is disposed in the path of an incident light beam which is spatially scanned by a light beam deflector. The bulk material of the lens element has a reflective layer disposed upon at least one of its surfaces, and is configured such that an incident light beam undergoes multiple passes through the acoustic wavefront propagating through the lens, prior to emerging from the lens. Aberration in the emerging beam due to multiple passes through the bulk material is corrected by a pupil plane correction plate.

26 Claims, 2 Drawing Sheets

5,801,874

OPTICAL SCANNING SYSTEM HAVING MULTI-PASS ACOUSTIC TRAVELING WAVE LENS

FIELD OF THE INVENTION

The present invention relates in general to optical scanning systems, and is particularly directed to a new and improved acoustic traveling wave lens configuration having reflective material disposed upon at least one surface of the bulk material of the lens, such that an incident light beam undergoes multiple passes through the acoustic wavefront propagating through the lens, prior to emerging from the lens along a beam travel path through a pupil plane corrective aperture.

BACKGROUND OF THE INVENTION

Acoustic traveling wave lens systems are used in a variety of signal processing and imaging applications, where precision control of a scanned optical beam is required. As a non-limiting example, such lens systems are employed in the semiconductor industry for the formation and inspection of etching and implant masks used in the manufacture of integrated circuits. As the line widths of the masks become increasingly narrow, the wavelengths used for this purpose have decreased to the ultraviolet range (e.g., on the order of 0.40–0.15 microns). The use of deep ultraviolet wavelengths has mandated the use of a material such as quartz, which as good transmissivity properties in this range, as opposed to most glass which becomes effectively opaque to light having a wavelength below 0.4 microns. Unfortunately, launching a traveling wave lens into quartz at such wavelengths requires very high power, making the system expensive to operate and generating a substantial amount of heat. To solve this problem, it would be desirable to reduce the amount of quartz bulk material into which the acoustic wave is launched.

SUMMARY OF THE INVENTION

In accordance with the present invention, the above-described objective is successfully achieved by configuring the acoustic traveling wave lens to provide for multiple passes of an incident optical beam through the traveling wave lens, and thereby effectively maximize utilization of the acoustic power. The multi-pass (folded) acoustic traveling wave lens configuration of the present invention is operative to produce the same scanning performance as a non-folded device with half the acoustic power. By utilizing the lens multiple times, the folded configuration of the present invention provides a more compact optical system.

For this purpose, the new and improved acoustic traveling wave lens of the invention comprises a lens of optically transmissive bulk material, such as quartz, that is disposed in the path of an incident light beam, that is spatially scanned by a light beam deflector, such as an acoustic optic beam deflector, disposed in the path of the light beam and being operative to spatially deflect or scan the light beam in accordance with a scanning control signal.

The bulk material of the lens element itself has reflective material disposed upon at least one of its surfaces, and is configured such that an incident light beam undergoes multiple passes through the acoustic wavefront propagating through the lens, prior to emerging from the lens. A lens arrangement, which may include a half-cylindrical lens, is disposed upstream of the lens in the path of the deflected light beam from the acousto-optic light beam deflector, so as to direct the deflected light beam along a first light beam path onto the front surface of the acoustic traveling wave lens.

In accordance with an embodiment of the invention, a rear surface of the bulk material of the lens element itself has a layer of reflective material, with the light beam being incident upon a front, convex surface of the lens, that forms a beam-focusing surface. The layer of reflective material on the rear surface causes an incident light beam that has passed once through a first portion of the acoustic traveling wave lens launched into the bulk material to travel along a return path through another portion of the traveling wave lens spatially separated from the first portion of the lens prior to emerging from the first, beam-focusing surface of the bulk material.

In a further embodiment of the invention, the bulk material of the lens element itself has a layer of reflective material disposed on both a rear surface and a front surface of the bulk material, with the light beam being incident upon the front, surface of the lens. These layers of reflective material on the rear and front surfaces cause multiple reflections of an incident light beam through respectively different portions of an acoustic traveling wave lens launched into the bulk material.

In the course of these multiple passes through the bulk material, some amount of aberration of the emerging beam will occur. To correct for this unwanted aberration, a corrective plate is disposed in the pupil plane of the beam emerging from the lens.

DETAILED DESCRIPTION

Figure 1:
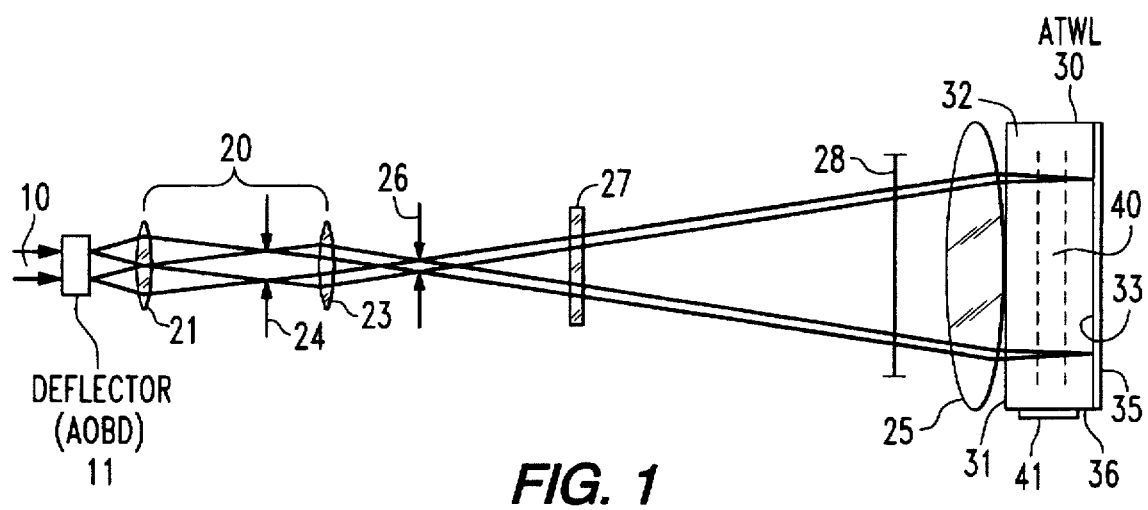
FIGS. 1 and 2 are respective diagrammatic side and top views of a first embodiment of an acoustic traveling wave lens system of the present invention.
Figure 2:
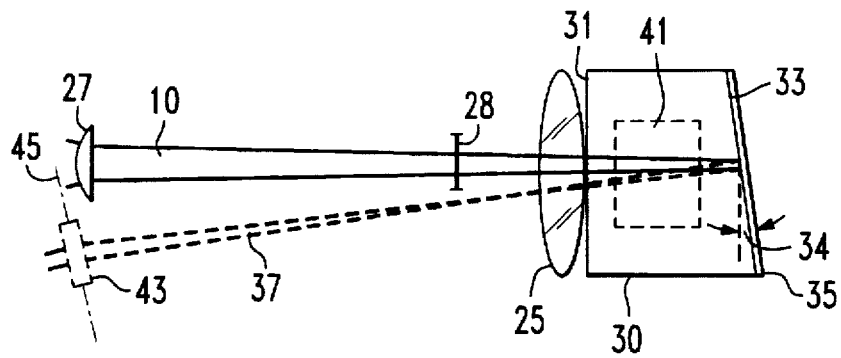

Referring now to FIGS. 1 and 2, a first embodiment of an acoustic traveling wave lens system of the present invention is diagrammatically illustrated as comprising an acousto-optic light beam deflector (AOBD) 11 disposed in the path of a light beam 10, such as an ultraviolet beam having a wavelength falling in a range of 0.15–0.40 microns generated by a laser, as a non-limiting example, and being operative to effect a two-dimensional (X-Y) spatial deflection of the light beam 10, in accordance with a light beam deflection control signal applied thereto.

Disposed downstream of AOBD 11 is a compound beam expansion lens arrangement 20. Compound lens arrangement 20 includes a first focusing lens 21, such as a six cm focal length convex lens, having a 6 mm aperture, which converts the beam scanned by AOBD into a very small spot (e.g., on the order of 2.5 microns, as a non-limiting example), which is scanned by the AOBD 11 across a prescribed scan aperture 24 (e.g., 750 microns). It further includes a second focusing lens 23, such as a six cm focal length lens, having a 1.5 mm aperture, which is operative to focus the scanned spot pattern into a pupil plane 26, to be collimated by a cylindrical lens 27 onto a downstream third focusing lens 25. Namely, lens arrangement 20 is operative to expand the spatially scanned beam 10 into a prescan line having a prescribed beam spot density (e.g., 300–2.5 micron diameter spots per a scan line width of 750 microns), that is projected as a scan line 28 onto the effective working aperture of third focusing lens 25, such as a 50 cm focal length, 6 cm aperture lens, disposed immediately adjacent to (in front of) an acoustic traveling wave lens 30.

Acoustic traveling wave lens 30 comprises a bulk optically transmissive material 32, such as quartz. As described above, in an application where ultraviolet wavelengths are employed, such as semiconductor mask manufacture and inspection, quartz provides a practical acoustic wave lens transmission medium which, in contrast to most glass, is not opaque to light at wavelengths below 0.4 microns. In the embodiment shown in FIGS. 1 and 2, lens 30 has a first generally planar front surface 31, which is effectively normal to the angle of incidence of the light beam 10, as spatially deflected by light beam deflector 11 and focussed thereon by lens 25.

ATWL 30 has a second generally planar rear surface 33, upon which a layer 35 of reflective material is disposed. As shown in the top view of FIG. 2, the generally planar rear surface 33 of lens 30 is oriented at an angle 34 relative to the plane of front surface 31, so that a light beam incident upon the front surface 31 of the lens and passing through the bulk material of the lens will be reflected off the reflective material 35 and directed back through the bulk material and emerge therefrom along a travel path 37 that is separated from the direction of incidence of the incoming beam 10.

As pointed out above, by redirecting the light beam back through the lens bulk material through which an acoustic traveling wave lens propagates, an incident light beam will undergo multiple passes through an acoustic traveling wave 40 and thereby effectively maximize acoustic power utilization. The acoustic traveling wave 40 is launched into the bulk material of the lens 30 from a transducer 41, such as a piezoelectric transducer, that is mounted to a surface 36 of the bulk material transverse to front and rear surfaces 31 and 33, respectively, so that a launched acoustic traveling wave will propagate in a direction that is generally transverse to the direction of travel of the light beam through the lens 30.

As described above, the multiple (e.g., double) passes of the light beam through the bulk material and thereby the acoustic traveling wave 40 propagating through the bulk material of the ATWL 30 in the present embodiment serve to substantially maximize utilization of acoustic power. This substantially full utilization of the lens aperture can be expected to be accompanied by some degree of aberration of the beam emerging from the front face 31 of the lens along travel path 37. To correct for this aberration, a corrective plate 43 may be disposed in the exit pupil 45 plane of the third focusing lens 25.

Figure 3:
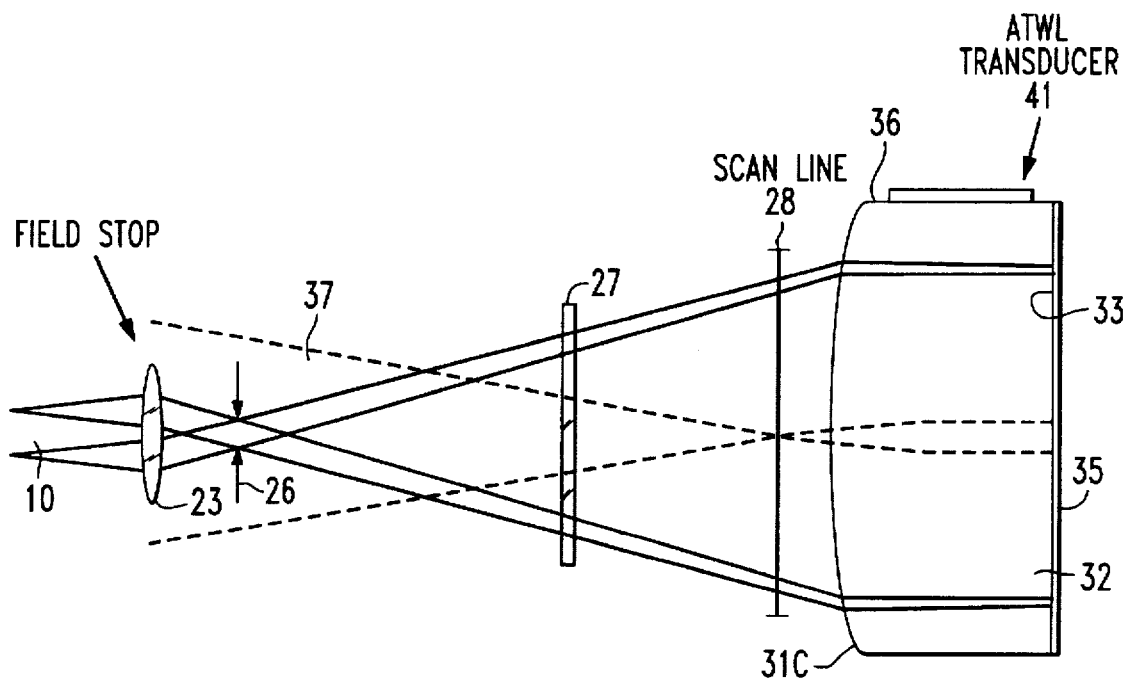
FIGS. 3 and 4 are respective diagrammatic side and top views of a modification of the embodiment of the acoustic traveling wave lens system of FIG. 1, wherein the acoustic traveling wave lens is configured to integrate a focusing lens into the bulk material of the acoustic traveling wave lens.
Figure 4:
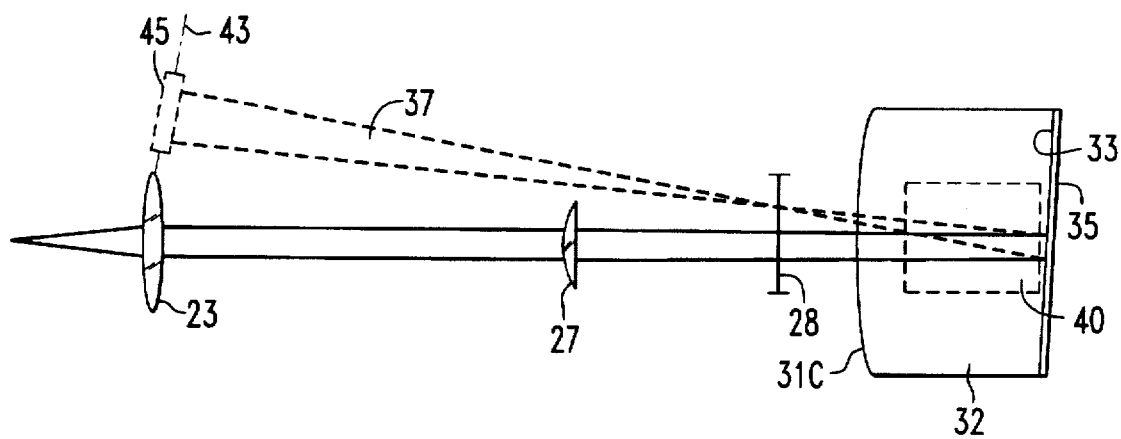

In an alternative embodiment shown in FIGS. 3 and 4, the bulk material of the acoustic traveling wave lens 30 has a convex front surface 31C, which serves to integrate the function of focusing lens 25 in the embodiment of FIGS. 1 and 2 into the lens proper, and thereby reduce the number of optical surfaces required to implement the lens combination. As described previously, in each of the above described embodiments, the layer of continuous reflective material on the rear surface of the lens causes light beam incident upon the front of the lens and having passed once through a first portion of the acoustic traveling wave 40 launched into the bulk material to travel along a return path through another portion of the acoustic traveling wave spatially separated from the first portion of the lens 30 prior to emerging from the first, beam-focusing surface 31C of the bulk material 32.

Figure 5:
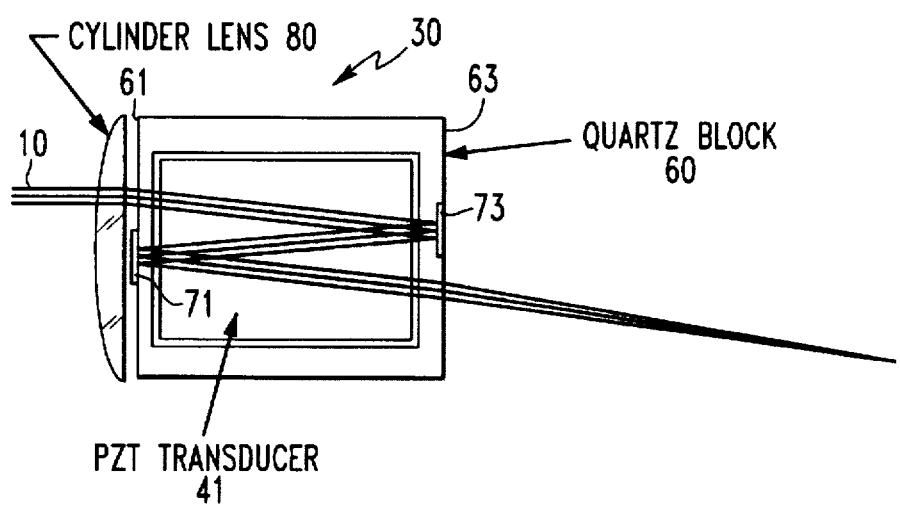
FIG. 5 diagrammatically illustrates an end view of a triple pass embodiment of an acoustic traveling wave lens system of the present invention.

In a third embodiment of the invention, diagrammatically illustrated in the end view of FIG. 5, the front and rear surfaces 61 and 63 of a generally solid rectangular bulk material, such as a quartz block 60, are generally parallel to one another and contain multiple layers of reflective material. In this 'triple-pass' embodiment, a pair of reflective layers 71 and 73 are respectively formed on surfaces 61 and 63 of the bulk material so as to cause the light beam 10 to traverse the traveling wave lens 30 three times. Depending upon the geometry parameters of the system, including the size of the bulk material, the cross section of the launching transducer and therefore that of the acoustic traveling wave, the cross section of the light beam, etc., more or fewer mirrors than those shown in FIG. 5 may be mounted to the front and rear surfaces of the bulk material, so as to tailor the number of reflections of the beam to the desired number of passes through the propagating lens and thereby optimize the utilization of the available acoustic power.

Disposed immediately adjacent to the front surface 61 is a half cylindrical lens 80, which focusses an incoming beam into the propagation path of the acoustic traveling wave launched from transducer 41. As a consequence, an incoming light beam incident upon lens 80 is focussed through the front surface 61 of the lens so as to pass through the propagating lens 40 and be incident upon reflective layer 71. From reflective layer 71 on the front surface of the bulk material, the beam is directed back through the acoustic traveling wave 40 and is incident upon reflective layer 73. After reflecting off reflective layer 73 on the rear surface 63 of the bulk material, the beam is further directed back through the acoustic traveling wave 40 and exits the bulk material via its rear surface 63.

As will be appreciated from the foregoing description, the above-described desirability of more fully utilizing a short wavelength optical transmission medium such as quartz for propagating an acoustic traveling wave lens, that normally requires very high power and generates a substantial amount of heat, is effectively obviated in accordance with the present invention, by configuring the acoustic traveling wave lens to provide for multiple passes of an incident optical beam through the bulk material and thereby effectively maximize utilization of acoustic power.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A light beam scanning system comprising:

a light beam deflector disposed in the path of said light beam and being operative to spatially deflect said light beam in accordance with a control signal applied thereto;

an acoustic traveling wave lens having a first surface and a second surface upon which reflective material is provided;

a lens arrangement disposed in the path of said deflected light beam so as to direct said deflected light beam along a first light beam path onto said first surface of an acoustic traveling wave lens, such that said deflected light beam incident upon said first surface of said acoustic traveling wave lens travels through said acoustic traveling wave lens, is reflected from said second surface thereof and travels through said acoustic traveling wave lens, to emerge from said first surface thereof along a second light beam separated from said first light beam path; and a light beam correction element disposed in said second light beam path.

2. A light beam scanning system according to claim 1, wherein said light beam correction element comprises a beam aberration corrector plate disposed at a pupil plane of said of said acoustic traveling wave lens.

3. A light beam scanning system according to claim 1, wherein said first surface of said acoustic traveling wave lens is configured as a beam-focusing lens surface.

4. A light beam scanning system according to claim 1, wherein said first surface of said acoustic traveling wave lens is a convex beam-focusing lens surface.

5. A light beam scanning system according to claim 4, wherein said second surface of said acoustic traveling wave lens is a planar surface.

6. A light beam scanning system comprising:

a light beam deflector disposed in the path of said light beam and being operative to spatially deflect said light beam in accordance with a control signal applied thereto;

an acoustic traveling wave lens disposed in the path of said light beam, having a first surface, upon which the light beam spatially deflected by said light beam deflector is incident, and a second surface, and wherein reflective material is disposed upon at least one of said first surface and said second surface, so as to cause said light beam to undergo multiple passes through said acoustic traveling wave lens prior to emerging from said acoustic traveling wave lens; and a light beam correction element disposed in said second light beam path.

7. A light beam scanning system according to claim 6, further including a lens arrangement disposed in the path of said deflected light beam so as to direct said deflected light beam along a first light beam path onto said first surface of said acoustic traveling wave lens, such that said deflected light beam incident upon said first surface of said acoustic traveling wave lens undergoes multiple passes as it travels through said acoustic traveling wave lens, being reflected by said reflected material and emerges from said acoustic traveling wave lens along a second light beam separated from said first light beam path.

8. A light beam scanning system according to claim 7, wherein said lens arrangement includes a cylindrical lens.

9. A light beam scanning system according to claim 6, wherein said light beam correction element comprises a beam aberration corrector plate disposed at a pupil plane of said of said acoustic traveling wave lens.

10. A light beam scanning system according to claim 6, wherein said first surface of said acoustic traveling wave lens is configured as a beam-focusing lens surface.

11. A light beam scanning system according to claim 6, wherein said first surface of said acoustic traveling wave lens is a convex beam-focusing lens surface.

12. A light beam scanning system according to claim 11, wherein said second surface of said acoustic traveling wave lens is a planar surface.

13. A light beam scanning system according to claim 6, wherein said first surface of said acoustic traveling wave lens is a planar surface.

14. A light beam scanning system according to claim 6, wherein said acoustic traveling wave lens is comprised of quartz bulk material.

15. A method for scanning a light beam comprising the steps of:

(a) directing said light beam through a light beam deflector which is operative to spatially deflect said light beam in accordance with a control signal applied thereto;

(b) focusing the light beam spatially deflected in step (a) onto an optically transmissive bulk medium through which an acoustic wave lens propagates from a transducer coupled thereto, said bulk medium having light reflective material disposed upon at least one surface thereof that is located to cause said light beam to undergo multiple passes through said acoustic wave lens propagating through said medium; and (c) disposing a light beam correction element in a pupil plane of said second light beam path, so as to correct for aberration of the light beam emerging from said optically transmissive bulk medium.

16. A method according to claim 15, wherein step (b) comprises directing said deflected light beam through a lens arrangement that focuses said deflected light beam along a first light beam path onto said first surface of said acoustic traveling wave lens, such that said light beam undergoes multiple passes as it travels through said acoustic traveling wave lens, and is reflected by said reflected material so as to emerge from said acoustic traveling wave lens along a second light beam path separated from said first light beam path.

17. A method according to claim 16, wherein said lens arrangement includes a cylindrical lens.

18. A method according to claim 15, wherein said first surface of said acoustic traveling wave lens is configured as a beam-focusing lens surface.

19. A method according to claim 15, wherein said first surface of said acoustic traveling wave lens is a convex beam-focusing lens surface.

20. A method according to claim 19, wherein said second surface of said acoustic traveling wave lens is a planar surface.

21. A method according to claim 15, wherein said first surface of said acoustic traveling wave lens is a planar surface.

22. A method according to claim 15, wherein said acoustic traveling wave lens is comprised of quartz bulk material.

23. A method of enhancing the utilization of optically transmissive bulk material through which an acoustic traveling wave lens propagates from a transducer coupled thereto, comprising the steps of:

(a) directing a light beam along a path containing said optically transmissive bulk material;

(b) causing said light beam to travel through said bulk medium along multiple passes through said acoustic wave lens propagating through said medium; and (c) passing said light beam through a light beam correction element to correct for aberration of the light beam emerging from said optically transmissive bulk medium.

24. A method according to claim 23, wherein step (a) comprises directing said light beam through a lens arrangement that focuses said light beam onto a first surface of said acoustic traveling wave lens, and wherein step (b) comprises causing said light beam to be reflected from reflective material along differently directed paths through said acoustic wave lens propagating through said medium.

25. A method according to claim 24, wherein step (a) comprises directing said light beam through a light beam deflector which is operative to spatially deflect said light beam in accordance with a control signal applied thereto.

26. A method according to claim 23, wherein said optically transmissive bulk material is quartz.

* * * * *